(12) United States Patent
Seo et al.

(10) Patent No.: US 9,483,984 B2
(45) Date of Patent: Nov. 1, 2016

(54) TOUCH SENSING DISPLAY DEVICE

(71) Applicant: Samsung Display Co., Ltd., Yongin (KR)

(72) Inventors: Seung Mi Seo, Seoul (KR); Jong Seo Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 54 days.

(21) Appl. No.: 14/460,964

(22) Filed: Aug. 15, 2014

(65) Prior Publication Data

US 2015/0070305 A1 Mar. 12, 2015

(30) Foreign Application Priority Data

Sep. 11, 2013 (KR) .................. 10-2013-0109369

(51) Int. Cl.
| | |
|---|---|
| *G09G 3/36* | (2006.01) |
| *G06F 3/044* | (2006.01) |
| *G06F 3/041* | (2006.01) |
| *G02F 1/1333* | (2006.01) |

(52) U.S. Cl.
CPC .............. *G09G 3/36* (2013.01); *G06F 3/044* (2013.01); *G06F 3/0412* (2013.01); *G06F 3/0414* (2013.01); *G02F 2001/133394* (2013.01); *G06F 2203/04106* (2013.01); *G06F 2203/04111* (2013.01)

(58) Field of Classification Search
CPC ....... G09G 3/36; G06F 3/044; G06F 3/0412; G06F 3/0414; G06F 2203/04111; G02F 1/13338
USPC .................................................. 345/173–179
See application file for complete search history.

(56) References Cited

U.S. PATENT DOCUMENTS

| | | | |
|---|---|---|---|
| 8,305,358 B2 | 11/2012 | Klinghult et al. | |
| 2010/0156843 A1* | 6/2010 | Paleczny ................. | G06F 3/016 345/174 |
| 2010/0156845 A1* | 6/2010 | Kim ..................... | G06F 3/03547 345/174 |
| 2010/0201652 A1* | 8/2010 | Caliskan ................ | G06F 3/016 345/177 |
| 2012/0044165 A1* | 2/2012 | Kwak ..................... | G06F 3/044 345/173 |
| 2012/0062513 A1 | 3/2012 | Kang et al. | |
| 2012/0146942 A1* | 6/2012 | Kamoshida ............. | G06F 3/044 345/174 |
| 2012/0200511 A1* | 8/2012 | Kim ..................... | G06F 3/0421 345/173 |
| 2013/0127784 A1* | 5/2013 | Martin ................ | G02B 26/001 345/175 |

(Continued)

FOREIGN PATENT DOCUMENTS

| | | |
|---|---|---|
| JP | 3150179 | 4/2009 |
| KR | 10-2009-0080356 | 7/2009 |

(Continued)

*Primary Examiner* — Amare Mengistu
*Assistant Examiner* — Jennifer Zubajlo
(74) *Attorney, Agent, or Firm* — H.C. Park & Associates, PLC

(57) ABSTRACT

A touch sensing display device includes: a thin film transistor array panel including a thin film transistor; and an opposing display panel facing the thin film transistor array panel. The opposing display panel includes a piezoelectric sensor including a capacitive sensor and a piezoelectric layer. The capacitive sensor includes sensing wires, driving wires, and a bridge connecting the sensing wires together or the driving wires together. The piezoelectric sensor further includes a pair of electrodes, the piezoelectric layer being disposed between the pair of electrodes. The bridge and a first electrode of the pair of electrodes are formed of the same material and in the same layer.

20 Claims, 19 Drawing Sheets

(56) References Cited

U.S. PATENT DOCUMENTS

2013/0271675 A1* 10/2013 Misaki .................... G06F 3/044
            349/12
2014/0022210 A1* 1/2014 Wu ..................... G02F 1/13338
            345/174

FOREIGN PATENT DOCUMENTS

| KR | 10-1084782 | 11/2011 |
| --- | --- | --- |
| KR | 10-1128989 | 3/2012 |
| KR | 10-1145157 | 5/2012 |
| KR | 10-1240967 | 3/2013 |

* cited by examiner

FIG. 15
275

TOUCH SENSING DISPLAY DEVICE

CROSS-REFERENCE TO RELATED APPLICATION

This application claims priority from and the benefit of Korean Patent Application No. 10-2013-0109369, filed on Sep. 11, 2013, which is incorporated by reference for all purposes as if set forth herein.

BACKGROUND

1. Field

Exemplary embodiments relate to a touch sensing display device, and, more particularly, to a touch sensing display device configured to sense differences in pressure.

2. Discussion

Conventional flat panel displays may include a touch sensor embedded therein to provide a touch sensing display device. The sensor may be configured to sense (or otherwise determine) a change in pressure or intensity of light that occurs when a touch instrument (e.g., a user's finger, touch pen, stylus, or the like) touches or hovers in proximity to the touch sensing display device. In this manner, the sensor may provide an electrical signal to a display device (or a controller) indicating a touch or hovering event. In association with touch events, the display device may determine whether a touch is made and the touched position based on the electrical signal. An indication of the determination and/or information regarding the touch/touch position may be provided to, for instance, another component of a device including the touch sensing display device to provide one or more interface features. It is also noted that the indication may be utilized to generate an image signal utilized to affect the presentation of the touch-sensing display device.

One type of touch sensing display device is based on capacitive touch sensing methodology. Capacitive touch sensing methodology is based on detecting touch events when actual contact occurs between an object having a conductive characteristic and, for instance, a screen of the touch sensing display device. It noted, however, that false-positive touch detection events may be generated even when an actual touch is not performed due, at least in part, to fluctuations in capacitance that may occur from parasitic capacitive coupling effects.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensing display device configured to perform a sensing operation according to an applied pressure associated with a touch event and determine a position of the touch event based on capacitive sensing methodology.

Additional aspects will be set forth in the detailed description which follows, and, in part, will be apparent from the disclosure, or may be learned by practice of the inventive concept.

A touch sensing display device, according to exemplary embodiments, includes: a thin film transistor array panel including a thin film transistor; and an opposing display panel facing the thin film transistor array panel. The opposing display panel includes a piezoelectric sensor including a capacitive sensor and a piezoelectric layer. The capacitive sensor includes sensing wires, driving wires, and a bridge connecting the sensing wires together or the driving wires together. The piezoelectric sensor further includes a pair of electrodes, the piezoelectric layer being disposed between the pair of electrodes. The bridge and a first electrode of the pair of electrodes are formed of the same material and in the same layer.

A method of manufacturing a touch sensing display device, according to exemplary embodiments, includes: forming capacitive sensor wires on a substrate; forming a first interlayer insulating layer on the capacitive sensor wires; forming a first electrode of a piezoelectric sensor on the first interlayer insulating layer; forming a piezoelectric layer on the first electrode; forming a second interlayer insulating layer on the piezoelectric layer and the first electrode; forming a first contact hole through the second interlayer insulating layer to expose a portion of the piezoelectric layer; forming second contact holes through the second interlayer insulating layer and the first interlayer insulating layer to expose respective portions of some of the capacitive sensor wires; and forming, in the same layer: a second electrode of the piezoelectric sensor on the second interlaying insulating layer and the portion of the piezoelectric layer through the first contact hole; and a bridge on the second interlayer insulating layer and the respective portions of the some of the capacitive sensor wires through the second contact holes.

According to exemplary embodiments, touch events may be detected based on capacitive sensing and pressure sensing methodology, which may reduce the potential of false-positive detections. To this end, exemplary touch sensing display devices may include at least one sensing layer formed in the same process utilized to form the display device, to simply the manufacturing process, as well as reduce manufacturing time and cost.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIGS. 5 to 16 are respective views of the touch sensing display device of FIG. 1 at various stages of manufacture, according to exemplary embodiments.

DETAILED DESCRIPTION OF THE ILLUSTRATED EMBODIMENTS

Figure 1:
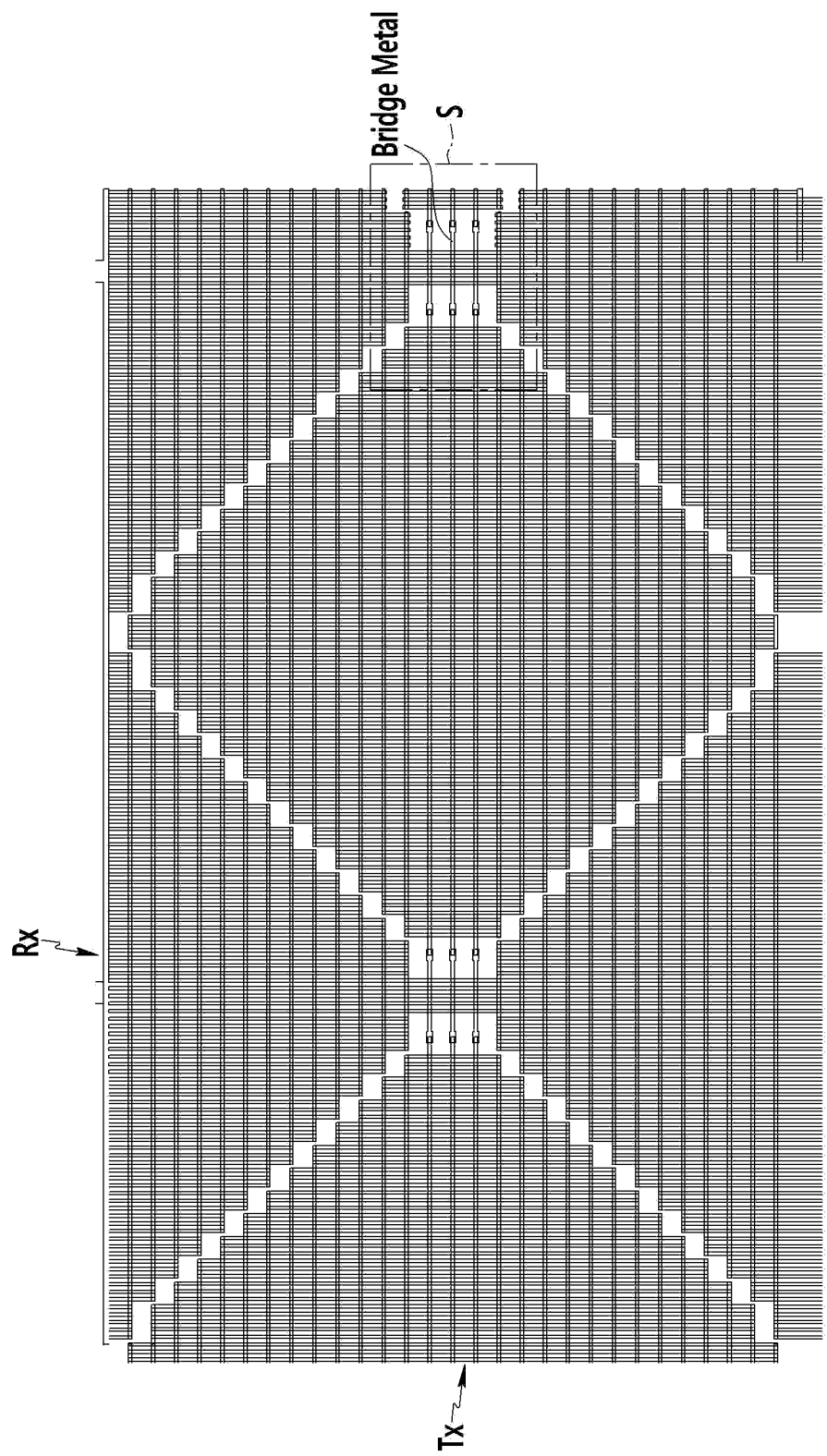
FIG. 1 is a layout view of a touch sensing display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although various exemplary embodiments are described with respect to liquid crystal display implementations of the touch sensing display device, it is contemplated that various exemplary embodiments are also applicable to various other types of display devices, such as, for example, organic light emitting display devices, plasma display devices, field emission display devices, electrophoretic display devices, electrowetting display devices, etc.

Figure 2:
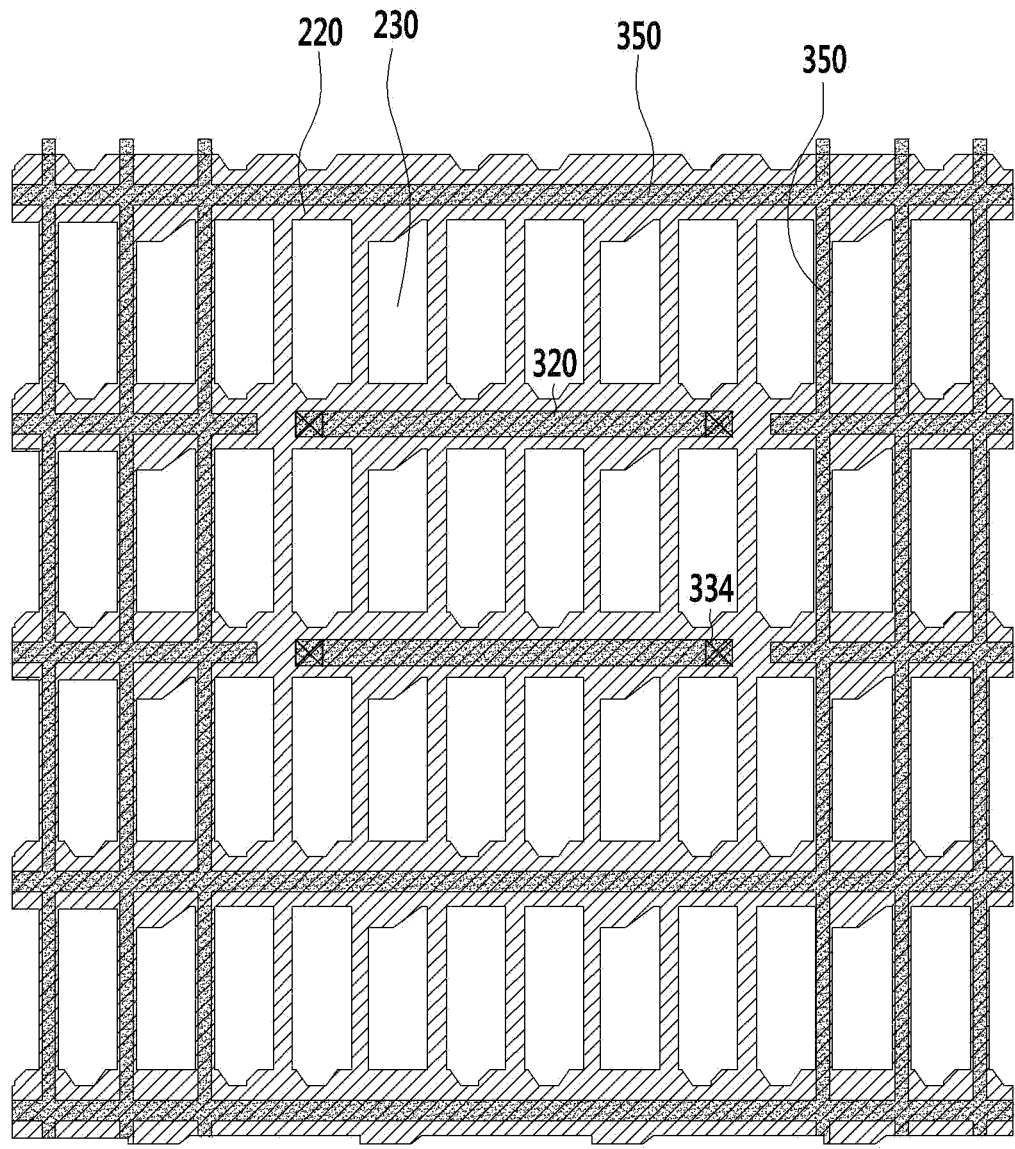
FIG. 2 is an enlarged plan view of a partial region of the touch sensing display device of FIG. 1, according to exemplary embodiments.
Figure 3:
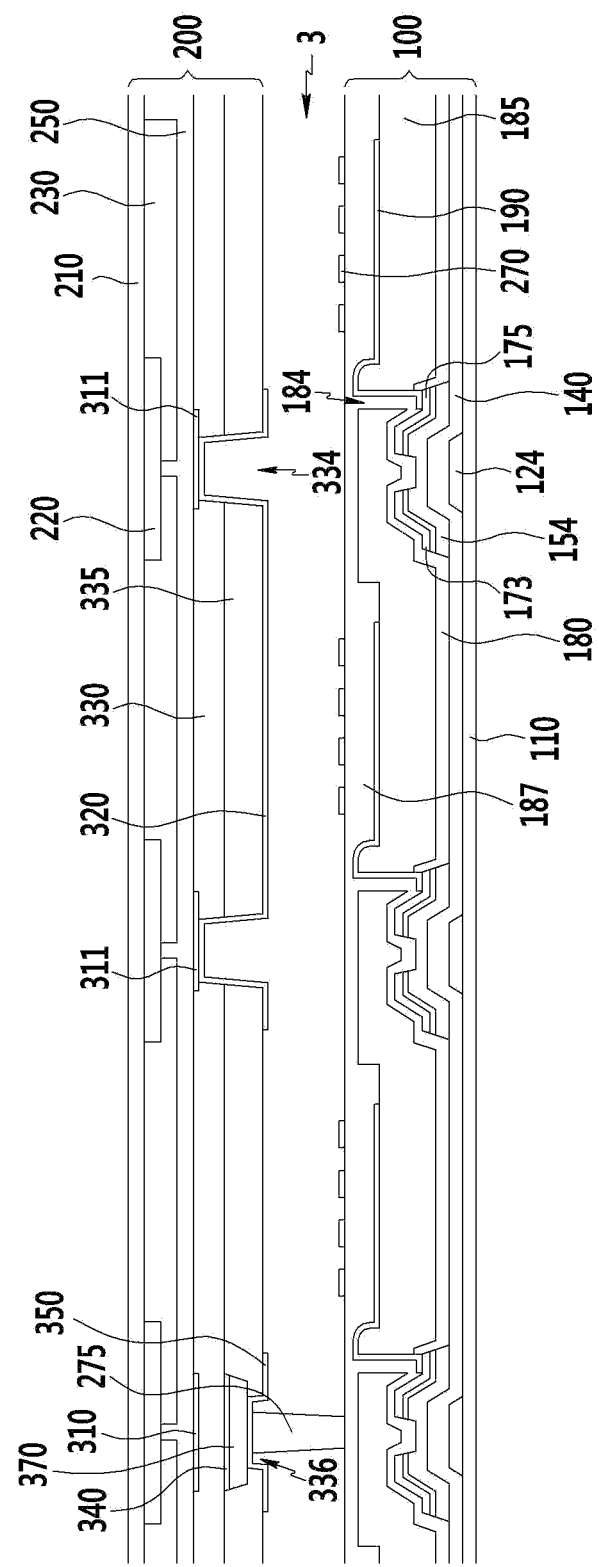
FIGS. 3 and 4 are respective cross-sectional views of the touch sensing display device of FIG. 1, according to exemplary embodiments.
Figure 4:
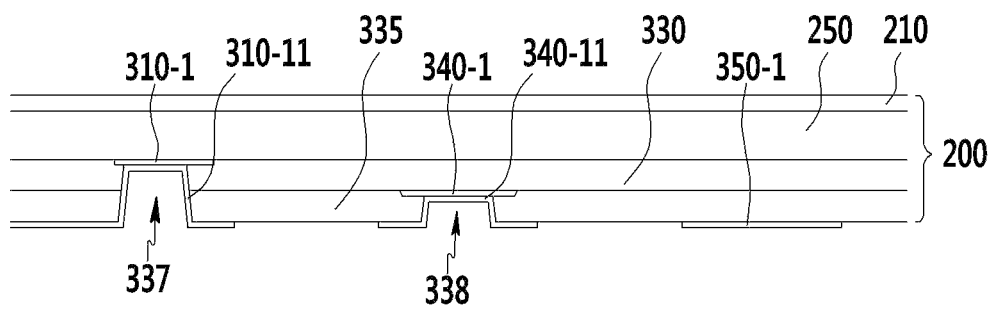

FIG. 1 is a layout view of a touch sensing display device, according to exemplary embodiments. FIG. 2 is an enlarged plan view of a partial region of the touch sensing display device of FIG. 1. FIGS. 3 and 4 are respective cross-sectional views of the touch sensing display device of FIG. 1.

A touch sensing display device, according to exemplary embodiments, may be a cell-type touch sensing display device, in which a sensor configured to sense touch events is formed in a substrate including a display device. The touch sensor may include a sensor having a piezoelectric layer and a capacitive sensing layer. That is, at least one among electrode layers of a capacitive-type sensor and a piezoelectric sensor may be formed in the same process, and, thereby, may be positioned in the same layer as one another.

According to exemplary embodiments, the touch sensing display device may include a display structure configured to display an image and a sensor structure configured to sense a touch. A structure of a capacitive-type sensor among sensors configured to sense a touch event is shown in FIG. 1.

A capacitive sensor, according to exemplary embodiments, may include a lattice of wires connected in transverse and vertical directions in a region where a light blocking member of an associated display device is formed. The lattice of wires may be divided into driving side wires Tx to transmit a driving signal and sensing side wires Rx to sense a touch event. The driving side wires Tx and the sensing side wires Rx may be formed of the same material, disposed in the same layer, and manufactured using the same process. Also, the driving side wires Tx and the sensing side wires Rx may be electrically separate from one another. As such, the driving side wires Tx and the sensing side wires Rx may have a rhombus structure, as well as include edges facing each other in an oblique direction. The driving side wires Tx and the sensing side wires Rx may be electrically separated from one another in a disconnection region extending in the oblique direction. The sensing side wires Rx may be electrically connected in the vertical direction, and sensing side wires Rx in the rhombus structure that are vertically adjacent to one another may be connected to each other through a longitudinal connection formed in the same layer and of the same material as the sensing side wires Rx. It is also noted that the driving side wires Tx in the rhombus structure that are horizontally adjacent to one another may be electrically connected through a bridge disposed in a different layer than the driving side wires Tx. It is contemplated, however, that the wires connected through the bridge may be the sensing side wires Rx, such that the driving side wires Tx may be connected through a connection formed in the same layer as the driving side wires Tx.

The driving side wires Tx and the sensing side wires Rx having the rhombus structure may have a length of about 4 mm in one direction. It is contemplated, however, that the size of the driving side wires Tx and the sensing side wires Rx may be altered in any suitable manner. For instance, the size of the driving side wires Tx and/or the sensing side wires Rx may be modified based on an object to be sensed.

A piezoelectric sensor (not shown) having a piezoelectric layer may be disposed inside the capacitive sensor having the aforementioned connection structure, as will become more apparent below. The piezoelectric sensor may be disposed at various positions. For instance, the piezoelectric sensor may be formed at a position where a spacer is located to maintain an interval between an upper substrate and a lower substrate of the display device including the sensors. The piezoelectric sensor may include a pair of electrodes disposed on and under the piezoelectric layer. One of the pair of electrodes may be formed in the same layer and of the same material as the bridge of the capacitive sensor, as well as formed in the same manufacturing process as the bridge.

An exemplary structure of the touch sensing display device will be described with reference to FIGS. 2 and 3, which focus on a region S disposed in a periphery of the touch sensing display device of FIG. 1. The periphery includes one or more bridges. That is, FIG. 2 provides an enlarged layout plan view of an illustrative upper (or opposing) display panel including a light blocking member 220 and a color filter 230 disposed in the region S. FIG. 3 provides a cross-sectional view of the region S, which illustrates the piezoelectric sensor including a piezoelectric layer 370 formed in the same layer as the bridge 320.

As seen in FIGS. 2 and 3, an opposing display panel 300 may include an upper substrate 210, a light blocking member 220, a color filter 230, and an overcoat 250. The upper substrate 210 may be formed of any suitable material, such as, for example, glass, transparent plastic, etc. The upper substrate may have a flexible characteristic when it is formed of the plastic material. When the upper substrate 210 is formed of glass, it may have a thickness of about 500 μm, and when formed of plastic, the upper substrate 210 may have a thickness of about 30 μm.

According to exemplary embodiments, the light blocking member 220 may be formed in a matrix shape including a plurality of openings (or apertures) defining pixel regions configured to present an image to an observer. A color filter 230 may be disposed in the opening of the light blocking member 220 to enable the pixels to display color. The light blocking member 220 and the color filter 230 may be covered by an overcoat 250. The overcoat 250 may remove a step in an intermediate surface of the opposing display panel 200, which may occur due to differences in thicknesses and/or positions of the light blocking member 220 and the color filter 230. In this manner, the overcoat 250 may provide a flat (or planar) intermediate surface.

With continued reference to FIG. 1, a region where the light blocking member 220 is formed on the overcoat 250 may include the driving side wires Tx and the sensing side wires Rx of the capacitive-type sensor. As previously mentioned, the driving side wires Tx and the sensing side wires Rx may include the same material, may be disposed in the same layer, and may be formed using the same process as one another. The sensing side wires Rx may be connected to one another via a longitudinal connection extending, for example, in a horizontal direction in FIG. 2. The driving side wires Tx, however, may not be electrically connected to one another in the same layer as the driving side wires Tx are disposed. That is, as seen in FIG. 3, where ends of the driving side wires Tx are designed as ends 311 and the sensing side wires Rx are indicated as capacitive sensor wire 310, the driving side wires Tx have ends 311 that are electrically connected to one another via bridge 320. Bridge 320 is formed in a different layer than the layer including the driving side wires Rx. It is noted that the driving side wires Tx and the sensing side wires Rx may be collectively referred to herein as capacitive sensor wires 310.

According to exemplary embodiments, the capacitive sensor wires 310 may be covered by a first upper interlayer insulating layer 330. A first electrode 340 of the piezoelectric sensor is disposed on the first upper interlayer insulating layer 330. The piezoelectric layer 370 is positioned under the first electrode 340 of the piezoelectric sensor. The piezoelectric layer 370 may be formed in an entire or partial region where the first electrode 340 is positioned. The piezoelectric layer 370 may have a width smaller than or equal to the width of the first electrode 340.

The piezoelectric layer 370 may be covered by a second upper interlayer insulating layer 335. The bridge 320 and the second electrode 350 of the piezoelectric sensor may be positioned under the second upper interlayer insulating layer 335. The bridge 320 may be electrically connected to respective ends 311 of the capacitive sensor wires 310. For this purpose, the first upper interlayer insulating layer 330 and the second upper interlayer insulating layer 335 have an end contact holes 334 exposing the ends 311. The second electrode 350 of the piezoelectric sensor is also connected with one end of the piezoelectric layer 370. For this purpose, the second interlayer insulating layer 335 has a piezoelectric contact hole 336 exposing the piezoelectric layer 370.

In exemplary embodiments, a spacer 275 may be disposed under the second electrode 350 of the piezoelectric sensor. When the touch sensing display device receives pressure via the spacer 275, the corresponding pressure may be transmitted to the piezoelectric layer 370, such that an intensity of the pressure may be sensed (or otherwise determined) by a current or a voltage generated in the piezoelectric layer 370.

Referring still to FIGS. 2 and 3, a thin film transistor array panel 100 may include a lower substrate 110, which may be formed of any suitable material, such as, for instance, glass, transparent plastic, etc. When formed of plastic, the lower substrate 110 may have a flexible characteristic. When the lower substrate 110 is formed of glass, it may have a thickness of about 500 µm, and when formed of plastic, the lower substrate 110 may have a thickness of about 30 µm. A gate line and a gate electrode 124 to transmit a scanning signal may be formed on the lower substrate 110. The gate line may extend in the horizontal direction, e.g., into the page with respect to FIG. 3, and the gate electrode 124 is protruded from the gate line in one direction.

In exemplary embodiments, a gate insulating layer 140 covers the gate line and the gate electrode 124. A semiconductor layer 154 may be formed on the gate insulating layer 140. The semiconductor layer 154 may be positioned on the gate electrode 124 and may cover the region where the gate electrode 124 is formed. The semiconductor layer 154 may be formed of any suitable material, such as, for instance, an amorphous semiconductor material, a polycrystalline semiconductor material, etc. As described herein, the semiconductor layer 154 will be assumed to be formed of the amorphous semiconductor material.

A data line and a drain electrode 175 may be formed on at least a portion of the semiconductor layer 154 and the gate insulating layer 140. The data lines extend in a longitudinal direction and are parallel (or substantially parallel) to each other. To this end, the direction of extension of the data lines may cross the direction of extension of the gate lines. It is also noted that each data line may include a source electrode 173 disposed on at least a portion of the semiconductor layer 154 and the gate insulating layer 140. The drain electrode 175 may be spaced apart from the source electrode 173. The gate electrode 124 may be disposed in an underlying layer and between the drain electrode 175 and the source electrode 173. The gate electrode 124, the semiconductor layer 154, the source electrode 173, and the drain electrode 175 form a thin film transistor. An ohmic contact layer, which may be made of a doped semiconductor material, a silicide material, or the like, may be disposed between the semiconductor layer 154 and the source electrode 173, as well as between the semiconductor layer 154 and the drain electrode 175.

A first protection layer 180 may be formed on the semiconductor layer 154, the data line, the source electrode 173, the drain electrode 175, and the gate insulating layer 140. The first protection layer 180 may include a lower contact hole 184 exposing a portion of the drain electrode 175. To this end, a pixel electrode 190 may be formed on the first protection layer 180 and may be electrically connected to the drain electrode 175 through the lower contact hole 184. An insulating layer 185 may be disposed between the first protection layer 180 and the pixel electrode 190. It is contemplated, however, that the first protection layer 180 and the insulating layer 185 may be combined. It is noted that the pixel electrode 190 and the common electrode 270 may be formed of any suitable transparent conductive material, such as, for instance, aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc. As such, the pixel electrode 190 may be configured to receive a data voltage through the drain electrode 175 based on a gate signal received by the thin film transistor via the gate line.

As seen in FIG. 3, a second protection layer 187 may cover the pixel electrode 190. A common electrode 270 may be formed on the second protection layer 187. The common electrode 270 may form a linear pattern. That is, in exemplary embodiments, the pixel electrode 190 may have a plate shape without openings, whereas the common electrode 270 may be formed having openings or a linear structure. As such, the pixel electrode 190 of the plate shape and the overlying common electrode 270 may generate an electric field (e.g., a horizontal electric field) in a liquid crystal layer 3 based on the reception of the data voltage by the pixel electrode 190 via the drain electrode 175.

The liquid crystal layer 3 may be formed between the thin film transistor array panel 100 and the opposing display panel 200. Liquid crystal molecules (not shown) of the liquid crystal layer 3 may be arranged so that an alignment direction thereof is changed by the imposition of the electric field generated by the pixel electrode 190 and the common electrode 270 of the thin film transistor array panel 100. It is noted that the spacer 275 may extend between the thin film transistor array panel 100 and the opposing display panel 200, and, thereby, extend through the liquid crystal layer 3.

Although not illustrated, respective alignment layers may be disposed between the liquid crystal layer 3 and each of the thin film transistor array panel 100 and the opposing display panel 200. Further, one or more polarization films (not shown) may be disposed outer surfaces of the thin film transistor array panel 100 and the opposing display panel 200. For example, a first polarization film may be disposed below the lower substrate 110 and a second polarization film may be disposed above the upper substrate 210.

Although described in association with a liquid crystal display implementation, it is contemplated that the touch sensing display device may correspond to any suitable type of display device. For instance, the touch sensing display device may be an organic light emitting display device, a plasma display device, a field emission display device, an electrophoretic display device, an electrowetting display device, other MEMS display devices, etc. To this end, it is noted that the spacer 275 is utilized to maintain an interval between the opposing display panel 200 and the thin film transistor array panel 100 in each display device, and the piezoelectric sensor is positioned on the spacer 275. The capacitive sensor and the piezoelectric sensor are positioned in the opposing display panel 200. One electrode of the piezoelectric sensor and the bridge of the capacitive sensor may be formed with the same material using the same manufacturing process, and, thereby, disposed in the same layer.

FIG. 4 is a cross-sectional view of the peripheral area in the touch sensing display device of FIG. 1, according to exemplary embodiments. That is, the peripheral area corresponds to a region of the touch sensing display device that does not include a display area in which an image is displayed and a touch is sensed. For instance, the peripheral area may enclose (or otherwise surround) the display area, as well as include a pad portion to transmit a signal applied to the display area. It is contemplated, however, that the peripheral area may partially surround the display area or may be disposed in one or more areas not constituting the display area. To this end, it is noted that FIG. 4 provides a cross-sectional view of the pad portion of the opposing display panel 200.

According to exemplary embodiments, the overcoat 250 may be formed under the upper substrate 210. A capacitance wiring pad 310-1 to apply a driving signal to the capacitive sensor wires 310 or receive a detection signal may be formed under the overcoat 250. Among the capacitive sensor wires 310, the capacitance wiring pad 310-1 connected to the driving side wires Tx may have a function of receiving and applying the driving signal to the driving side wires Tx. The capacitance wiring pad 310-1 connected to the sensing side wires Rx may have a function of transmitting a detection signal from the sensing side wires Rx to a sensing unit (not shown), such as a controller of a device including the touch sensing display device.

The capacitance wiring pad 310-1 may be covered by the first upper interlayer insulating layer 330. A first electrode pad 340-1 to transmit signals to the piezoelectric sensor of the first electrode 340 may be positioned under the first upper interlayer insulating layer 330, such that the first electrode pad 340-1 may be covered by the second upper interlayer insulating layer 335. A second electrode pad 350-1 to provide a signal to the second electrode 350 of the piezoelectric sensor may be positioned under the second upper interlayer insulating layer 335. It is noted that contact holes 337 and 338 may be formed to expose the capacitance wiring pad 310-1 and the first electrode pad 340-1. That is, the contact hole 337 exposing the capacitance wiring pad 310-1 may be formed in the first upper interlayer insulating layer 330 and the second upper interlayer insulating layer 335. The capacitance wiring pad 310-1 may be electrically connected to a first auxiliary electrode 310-11 through the contact hole 337. Although not illustrated, the first auxiliary electrode 310-11 may be connected to wires (e.g., external wires) to provide a signal (e.g., an external signal) to the capacitive sensor wires 310.

In exemplary embodiments, a portion of the first electrode pad 340-1 may be exposed through the contact hole 338. That is, the contact hole 338 may extend through the second upper interlayer insulating layer 335 to expose the portion of the first electrode pad 340-1. The first electrode pad 340-1 may be electrically connected to a second auxiliary electrode 340-11 through the contact hole 338. Although not illustrated, the second auxiliary electrode 340-11 may be connected to wires (e.g., external wires) to provide a signal (e.g., an external signal) to the first electrode 340 of the piezoelectric sensor.

As seen in FIG. 4, the second electrode pad 350-1 may not include an additional auxiliary electrode. That is, because the second electrode pad 350-1 is not covered by, for instance, an insulating layer, an additional auxiliary electrode may be omitted. It is contemplated, however, that when forming a layer covering the second electrode pad 350-1, the second electrode pad 350-1 may be exposed through a contact hole and may be connected to an additional auxiliary electrode, which may extend into the contact hole exposing the additional auxiliary electrode.

A method of manufacturing the touch sensing display device of FIG. 1 is described in association with FIGS. 5 to 16. FIGS. 5 to 16 are respective views of the touch sensing display device of FIG. 1 at various stages of manufacture, according to exemplary embodiments. It is noted that, when manufacturing the opposing display panel 200, each layer may be formed on the upper substrate 210. As such, the upper substrate 210 may be turned over and coupled to the thin film transistor array panel 100 with the liquid crystal layer 3 disposed therebetween to form the touch sensing display device of FIG. 1. It is also noted that the formation of the opposing display panel 200 is described with respect to various cross-sectional views, in which upper/top and lower/bottom references are reversed with regard to FIG. 3.

Figure 5:
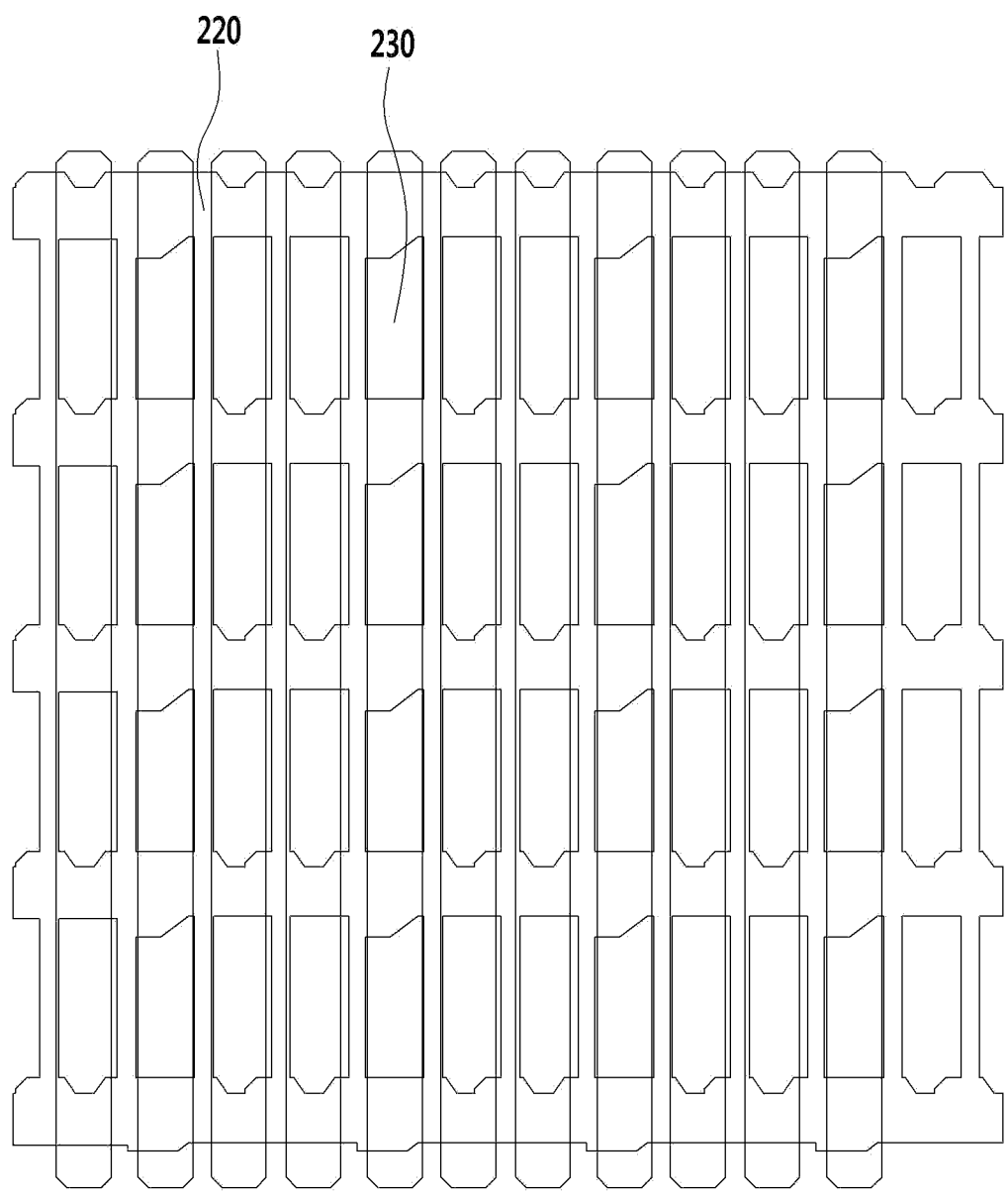
Figure 6:
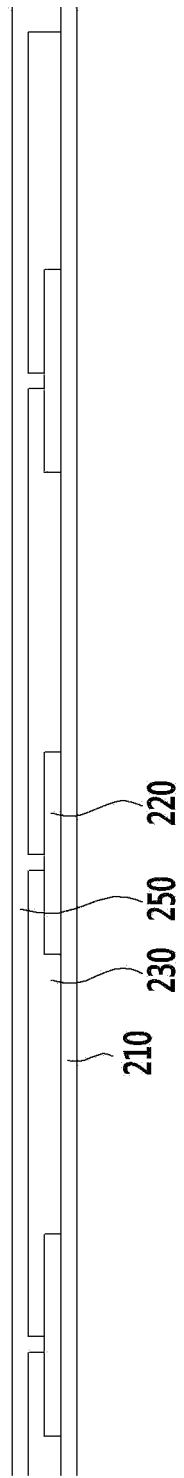

As seen in FIGS. 5 and 6, a light blocking member 220 is formed on the upper substrate 210. The light blocking member 220 may have a lattice structure that extends in transverse and vertical directions, as well as includes openings formed between light blocking members 220 defining corresponding pixels. The openings may have various shapes, such as seen in FIG. 5. That is, adjacent pixels may have different shapes in a plan view.

Color filters 230 are formed in the openings of the light blocking member 220, such that color filters 230 with the same color may be formed in pixels of a first direction (e.g., the vertical direction) and color filters 230 of pixels in a second direction (e.g., the transverse direction) may be of different colors. It is contemplated, however, that any other suitable arrangement of color filters 230 may be utilized in association with exemplary embodiments described herein. To this end, an overcoat 250 covering the light blocking member 220 and the color filters 230 is formed thereon. The overcoat 250 may be formed of any suitable material, e.g., an organic material, to providing a flat (or planar) surface.

Figure 7:
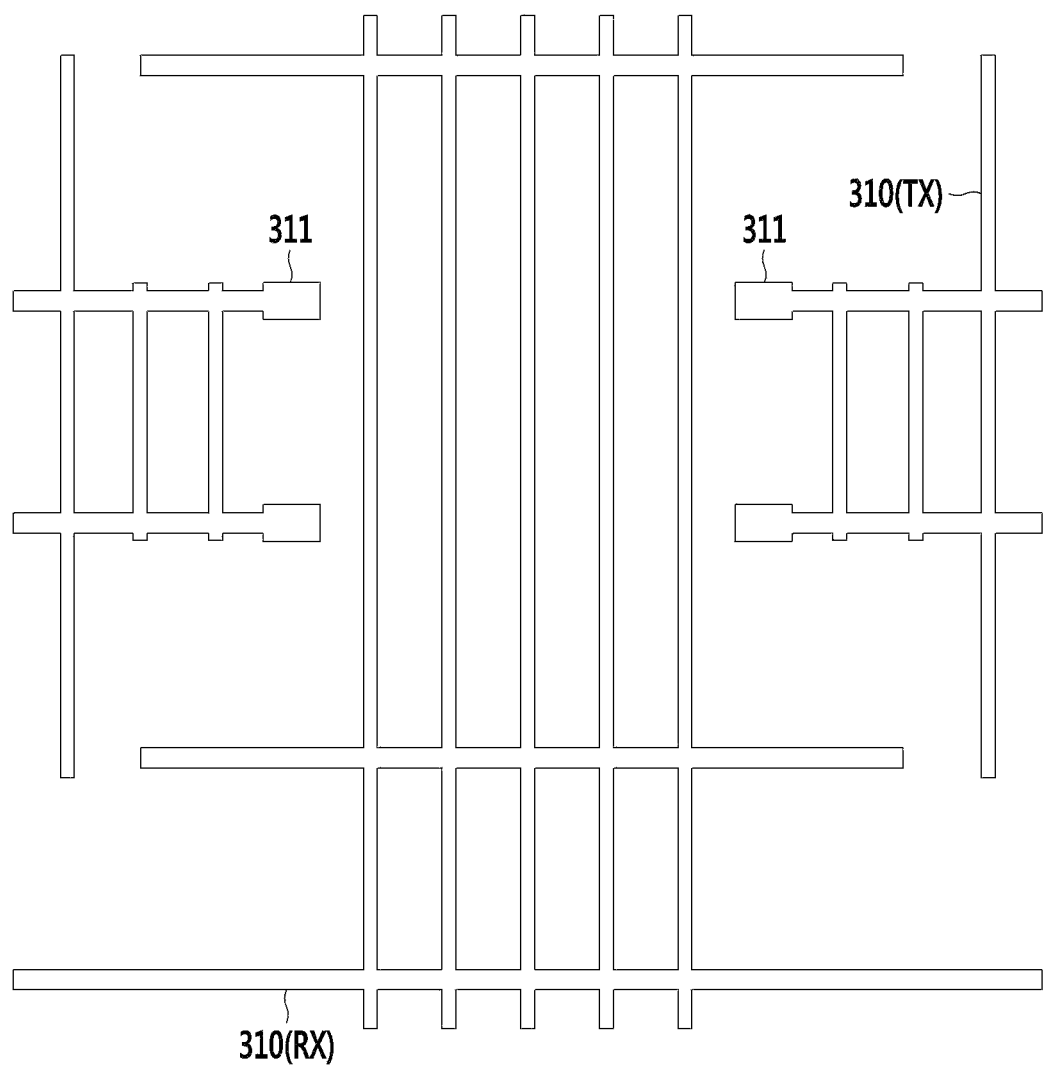
Figure 8:
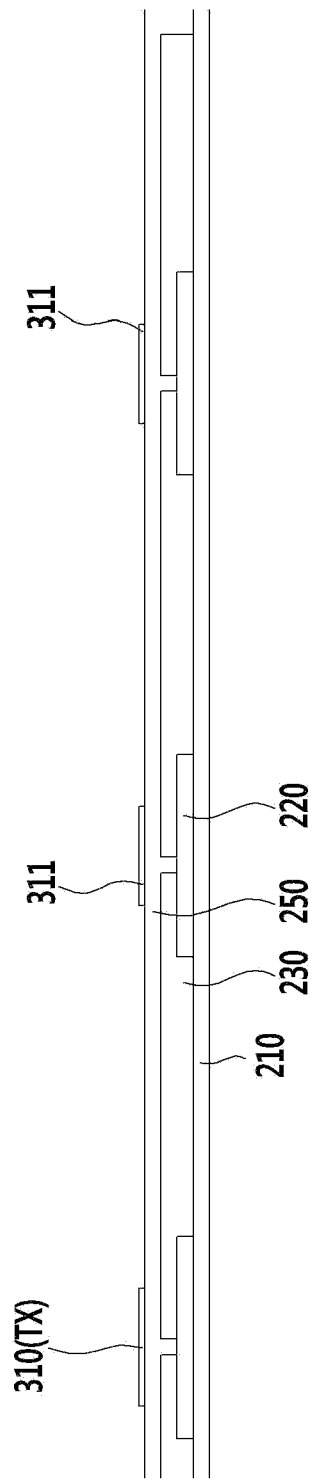

As described above, the opposing display panel 200 includes the sensor structure to sense the touch, the formation of which will be described in more detail with reference to FIGS. 7 to 16. Referring to FIGS. 7 and 8, capacitive sensor wires 310 are formed on the overcoat 250 formed as shown in FIGS. 5 and 6. The capacitive sensor wires 310 include driving side wires Tx and sensing side wires Rx. It is noted that the capacitive sensor wires 310 are disposed on and overlap the light blocking member 220. The sensing side wires Rx, which are connected in the transverse and vertical directions, are formed in a unit structure, such as the rhombus shape of FIG. 1. Adjacent rhombus structures of the sensing side wires Rx spaced apart from one another in a first (e.g., vertical) direction are connected through a longitudinal connection, which may also extend in the first direction. The longitudinal connection is formed with the same material and in the same layer as the sensing side wires Rx of the capacitive sensor wires 310. The formation of the longitudinal connections may be performed the same process as utilized to form the sensing side sides Rx.

In exemplary embodiments, the driving side wires Tx, which are connected in the transverse and vertical directions, are formed in a unit structure, such as the rhombus shape of FIG. 1. Adjacent rhombus structures of driving side wires Tx spaced apart from one another in a second (e.g., horizontal) direction are electrically separated from each other. Respective ends 311 of the rhombus structures corresponding to the driving side wires Tx may be formed with an enlarged wire width to increase, and, thereby, improve a contact patch. It is noted that the respective ends 311 of adjacent rhombus structures may be electrically connected via a bridge connection described in more detail in association with FIGS. 13 and 14. To this end, a portion where the ends 311 and the longitudinal connection are formed is referred to herein as a bridge connection region.

Figure 9:
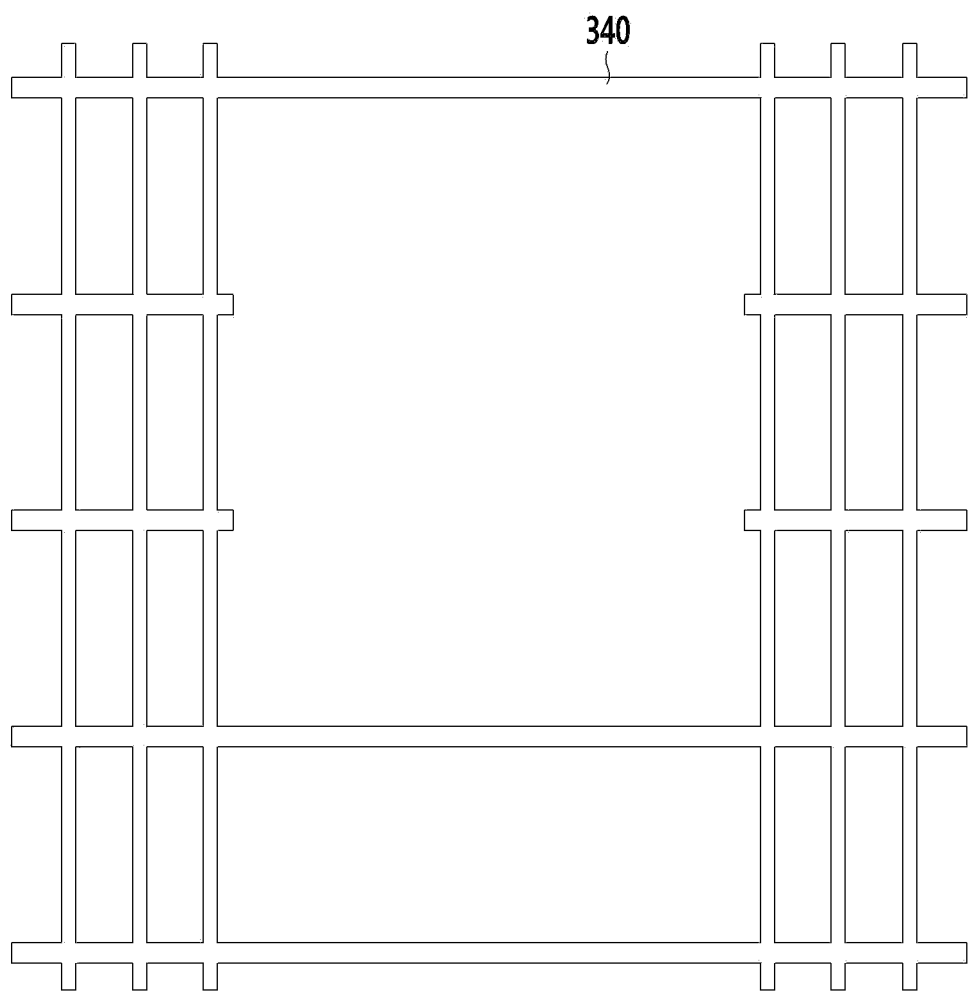
Figure 10:
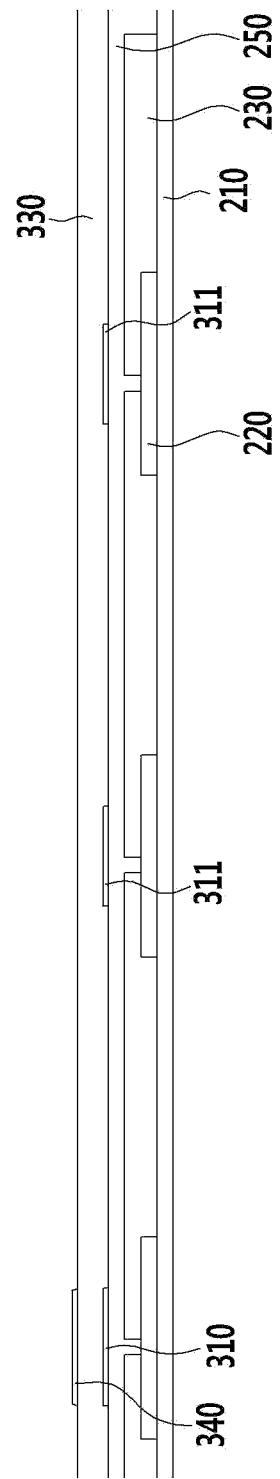

Adverting to FIGS. 9 and 10, a first upper interlayer insulating layer 330 is formed covering the capacitive sensor wires 310. The first electrode 340 of the piezoelectric sensor is formed on the first upper interlayer insulating layer 330. As seen in FIG. 9, the first electrode 340 of the piezoelectric sensor is formed in a pattern having a lattice shape in a region except for the bridge connection region. As result, the first electrode 340 has a portion overlapping the driving side wires Tx and a portion overlapping the sensing side wires Rx among the capacitive sensor wires 310. The portion overlapping the driving side wires Tx and the portion overlapping the sensing side wires Rx are connected to each other and have a structure overlapping the light blocking member 220.

Figure 11:
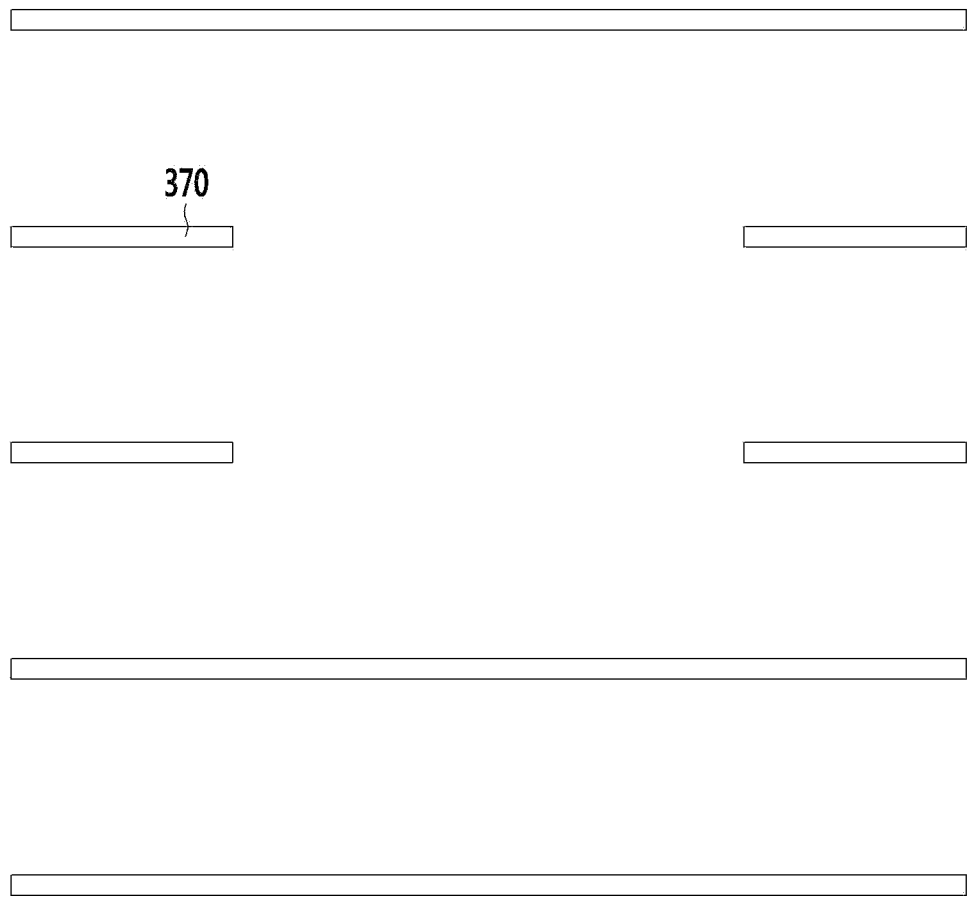
Figure 12:
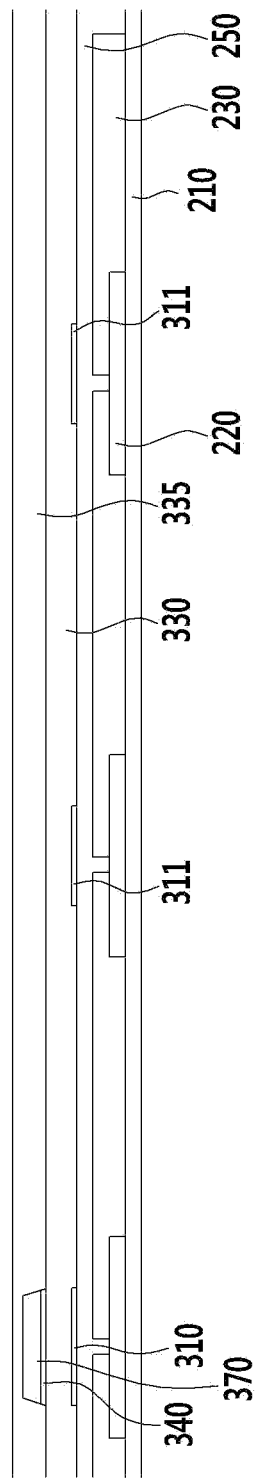

Referring to FIGS. 11 and 12, a piezoelectric layer 370 is formed on the first electrode 340. The piezoelectric layer 370 is formed in the second (e.g., horizontal) direction, such that the piezoelectric layer 370 is positioned on portions of the first electrode 340 extending in the second direction. The piezoelectric layer 370, however it is not formed on portions of the first electrode 340 extending in the first (e.g., vertical) direction. It is contemplated, however, that the piezoelectric layer 370 may be formed on portions of the first electrode 340 extending in the first (e.g., vertical) direction instead of the second (e.g., horizontal) direction or may be formed on the entire (or substantially entire) first electrode 340, e.g., on both the portions extending in the first and second directions. It is noted that forming the piezoelectric layer 370 in a partial region of the first electrode 340 may reduce manufacturing cost and still enable a pressure of a touch event to be sufficiently sensed even though the piezoelectric layer 370 is not formed on the entire first electrode 340.

Figure 13:
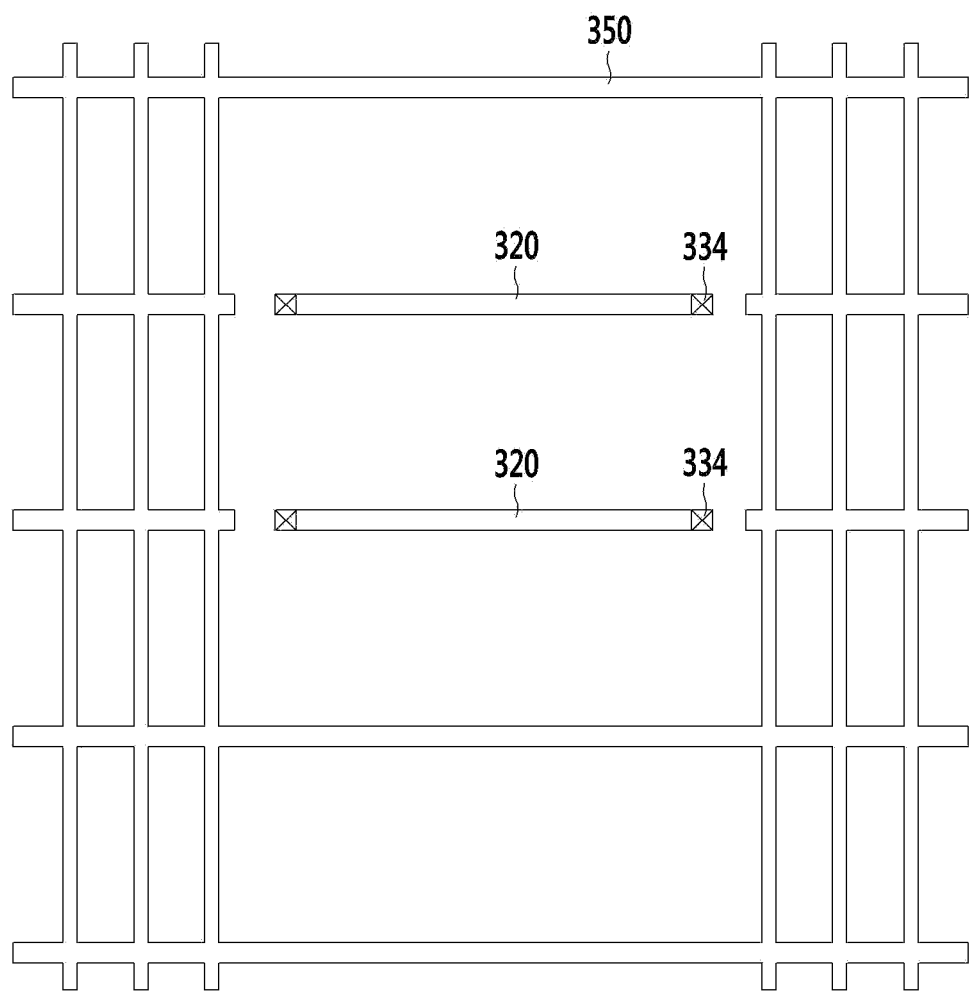
Figure 14:
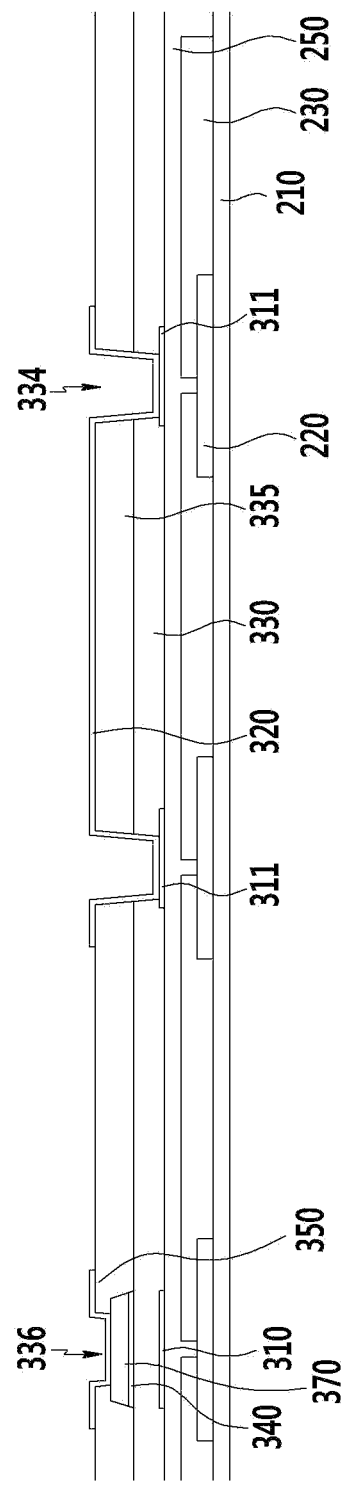

As seen in FIG. 12, the second upper interlayer insulating layer 335 is formed on the piezoelectric layer 370 and the first upper interlayer insulating layer 330. Referring to FIGS. 13 and 14, an end contact hole 334 exposing the end 311 and a piezoelectric contact hole 336 exposing the piezoelectric layer 370 are formed in the second upper interlayer insulating layer 335. The end contact holes 334 are formed in the second upper interlayer insulating layer 335 and the first upper layer interlayer insulating layer 330 to expose a portion of the ends 311. It is also noted that the piezoelectric contact holes 336 may be formed in the second upper interlayer insulating layer 335 to expose a portion of the piezoelectric layer 370 extends in the second (e.g., horizontal) direction.

Referring to FIG. 13, the bridge 320 and a second electrode 350 of the piezoelectric sensor are formed. The bridge 320 is formed on the second upper interlayer insulating layer 335 and the exposed portions of the ends 311. In this manner, the bridge 320 may extend in the second (e.g., horizontal) direction in the bridge connection region to electrically connect the ends 311 exposed by the end contact holes 334 to each other. As such, the electrically connected ends 311 of adjacent unit structures of the driving side wires Tx enables the adjacent unit structures that are spaced apart from one another in the second direction to also be electrically connected to one another. Although FIG. 13 illustrates two bridges 320 formed in the bridge connection region, it is contemplated that the number of bridges may vary based on the configuration of the unit structures of driving side wires Tx. In this manner, the bridge connection region may include any suitable number of bridges 320.

The second electrode 350 of the piezoelectric sensor is formed on the second upper interlayer insulating layer 335 and the exposed portion of the piezoelectric layer 370. In this manner, the second electrode 350 may be formed with a wiring pattern having the lattice structure of the first electrode 340. As such, the second electrode 350 may not be formed in the bridge connection region. A portion of the second electrode 350 that extends in the second direction contacts the piezoelectric layer 370 via the piezoelectric contact hole 336 and the portion of the second electrode 350 that extends in the second direction is formed on the second upper interlayer insulating layer 335. It is noted that the bridge 320 and the second electrode 350 of the piezoelectric sensor overlap the light blocking member 220 and are formed in the same layer and with the same material using the same process as one another.

Figure 16:
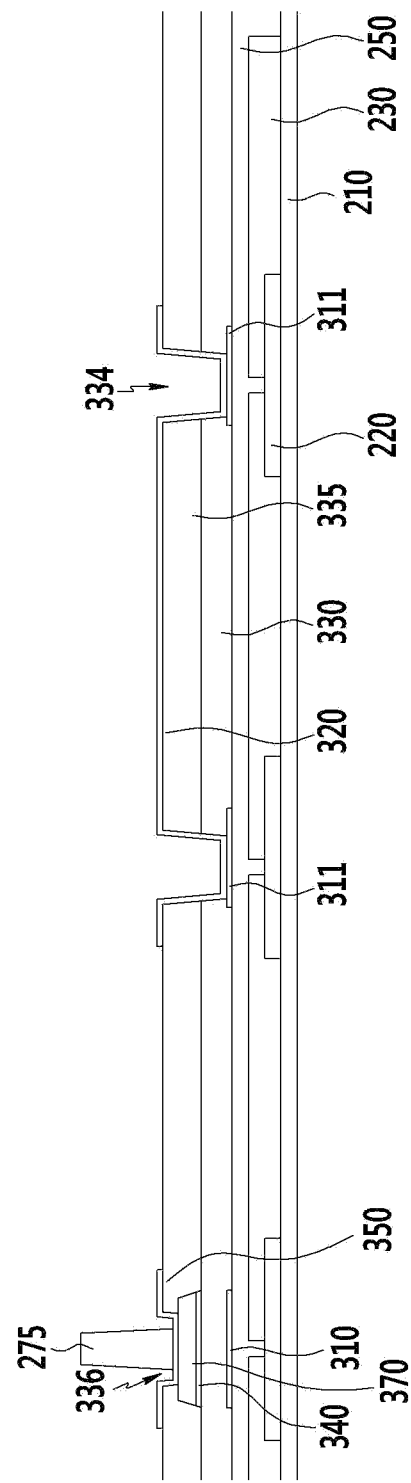

Adverting to FIGS. 15 and 16, spacers 275 are formed in regions overlapping the light blocking member 220. The spacers 275 overlap the second electrode 350 of the piezoelectric sensor; however, it is also contemplated that one or more spacers 275 may be formed in the bridge connection region. In this manner, the positioning of the spacers 275 may not coincide with the positioning of the piezoelectric sensor. A first surface of the spacer 275 contacts the thin film transistor array panel 100 and a second surface of the spacer contacts the opposing display panel 300 so as to maintain an interval between the thin film transistor array panel 100 and the opposing display panel 200. In exemplary embodiments, spacers 275 positioned on the second electrode 350 of the piezoelectric sensor may apply pressure to the piezoelectric layer 370 to generate a current or a voltage in the piezoelectric layer 370 when pressure is applied as a result of, for instance, a touch event. The spacers 275 disposed on the second electrode 350 also provide an interval maintaining function.

According to exemplary embodiments, the piezoelectric sensor has a one connection structure in the touch sensing display device. That is, the piezoelectric layer 370 may only extend in the second (e.g., horizontal) direction and may be divided in plural. The first electrode 340 and the second electrode 350, however, extend in the first and second directions (e.g., the transverse direction and the longitudinal direction) to have a connected structure. As a result, the piezoelectric sensor may sense the sum of the pressure applied to the touch sensing display device, such that the position at which the touch is generated may not be detected. It is noted, however, that the position at which the touch is generated may be sensed (or otherwise determined) using the capacitive sensor.

In exemplary embodiments, the piezoelectric layer 370 generates a current or voltage when the pressure is applied and the pressure is reduced. However, when the pressure is applied and the pressure is reduced, the polarities of the voltages are opposite to each other and the current directions are opposite to each other. When, however, a touch in which the piezoelectric layer 370 is applied with uniform pressure for a longer duration of time, the change of the current or the voltage is not generated. In this manner, it may be difficult to confirm whether the touch is performed, but when the opposite polarity voltage or the opposite direction current flows in response to the touch being removed, the piezoelectric sensor may sense that the touch is generated, thereby sensing the touch.

Figure 17:
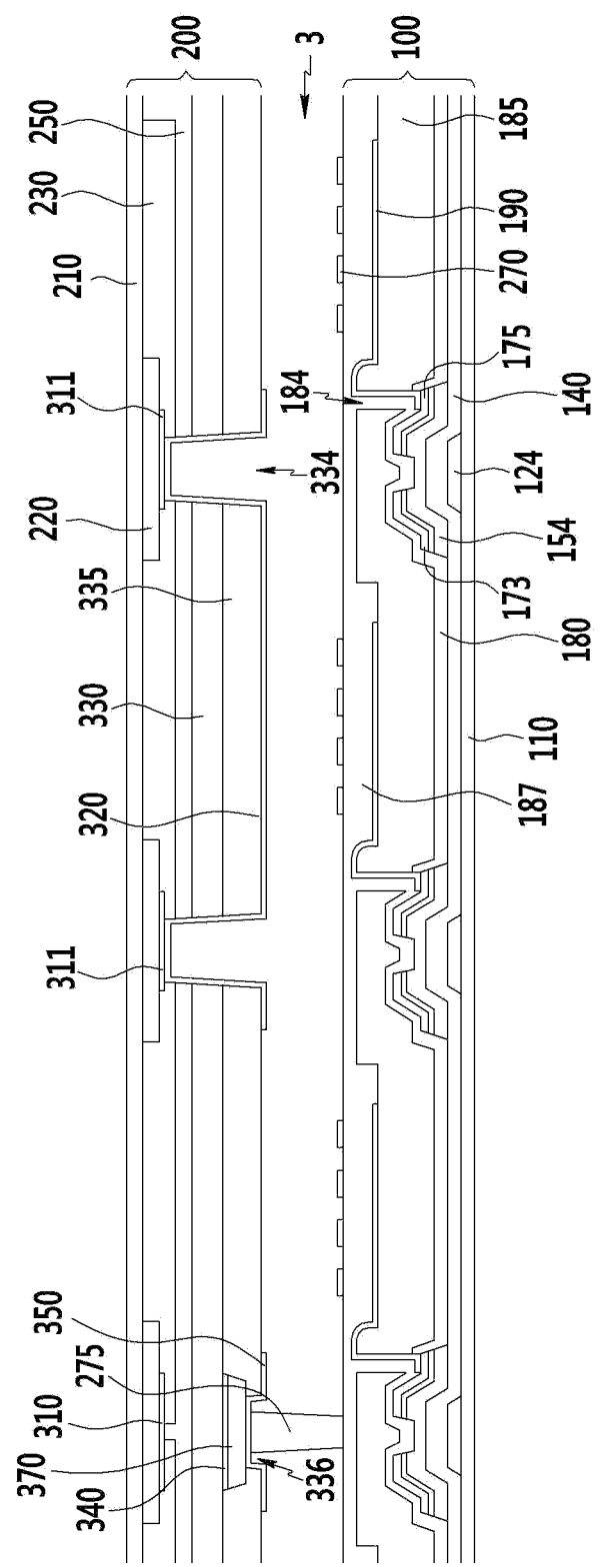
FIGS. 17 and 18 are respective cross-sectional views of a touch sensing display device, according to exemplary embodiments.
Figure 18:
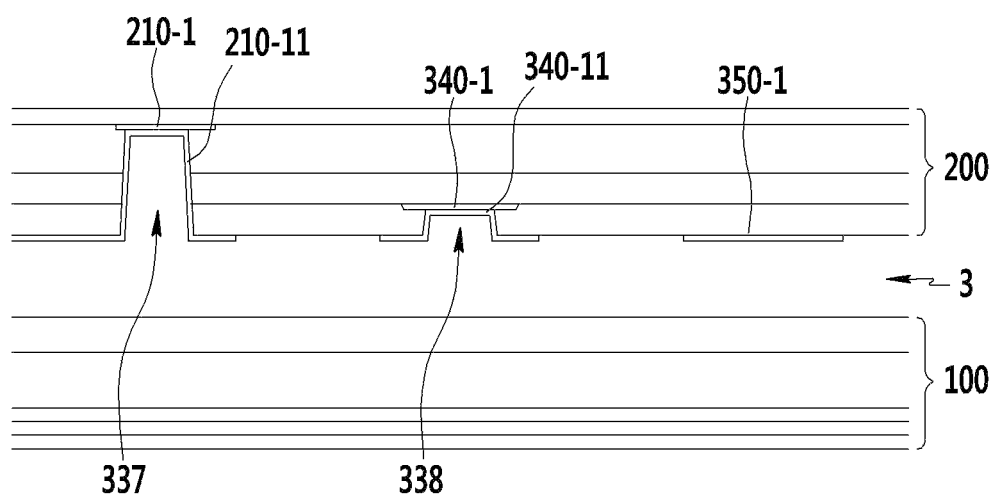

FIGS. 17 and 18 are respective cross-sectional views of a touch sensing display device, according to exemplary embodiments. The touch sensing display device of FIGS. 17 and 18 is substantially similar to the touch sensing display device of FIGS. 3 and 4, except that the touch sensing display of FIGS. 17 and 18 includes the capacitive sensor wires 310 and the ends 311 being formed under the light blocking member 220 and the capacitance wiring pads 310-1 are formed under the upper substrate 210. As such, to avoid obscuring exemplary embodiments described herein, duplicative descriptions are omitted.

The touch sensing display device of FIGS. 17 and 18 may enable the distance between the capacitive sensor wires 310 and the first electrode 340 of the piezoelectric sensor to be further disposed from one another than in the touch sensing display device of FIGS. 3 and 4, which may enable signal confusion/cross-talk to be reduced. A depth of the end contact holes 334 and the contact hole 337 in the touch sensing display device of FIGS. 17 and 18 may be deeper than the corresponding features in the touch sensing display device of the FIGS. 3 and 4. This may increase the difficulty of forming the end contact holes 334 and the contact holes 337.

It is also contemplated that the piezoelectric sensor may be formed in a sealed region where the thin film transistor array panel 100 and the opposing display panel 200 are sealed (or otherwise coupled), e.g., which may correspond to a non-display area of the touch sensing display device. This is described in more detail in association with FIG. 19.

Figure 19:
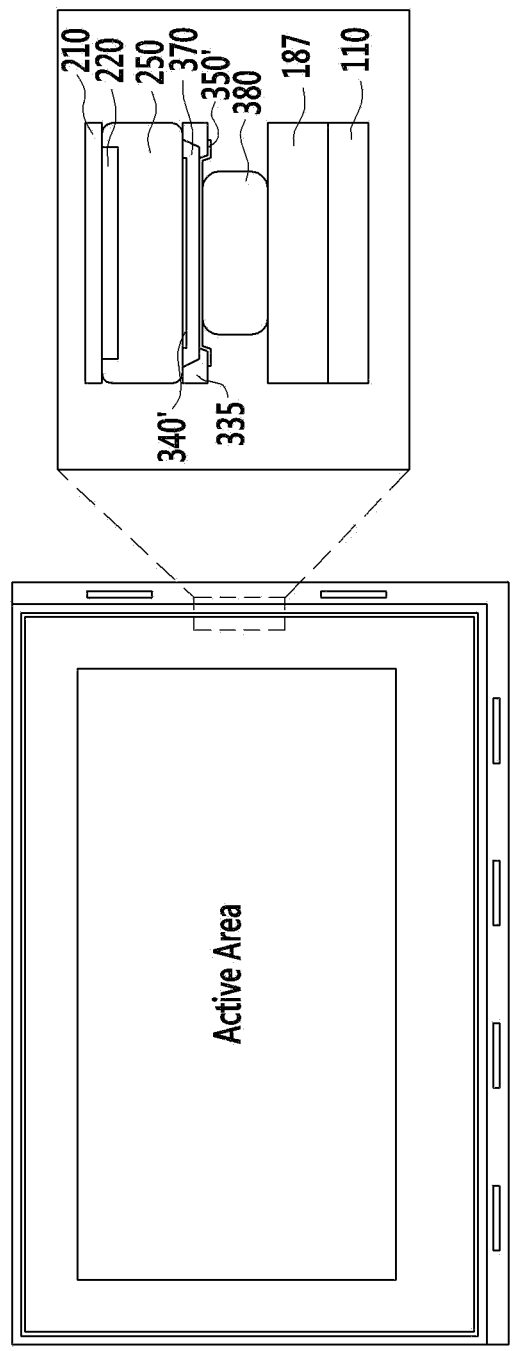
FIG. 19 is a layout view of a touch sensing display device, according to exemplary embodiments.

FIG. 19 is a layout view of a touch sensing display device, according to exemplary embodiments.

According to exemplary embodiments, the capacitive sensor is formed along with the pixels configured to display an image in the display area (e.g., active area) of the touch sensing display device. The piezoelectric sensor, however, is not formed in the display area, but a non-display area of the touch sensing display device. For instance, the piezoelectric sensor may be formed in a region where a seal member 380 utilized to seal the liquid crystal layer 3 between the thin film transistor array panel 100 and the opposing display panel 200 is formed.

Referring to FIG. 19, the piezoelectric sensor is positioned between the opposing display panel 200 and the seal member 380. The piezoelectric sensor may include the piezoelectric layer 370 and a pair of electrodes 340' and 350' positioned on and under the piezoelectric layer 370. That is, a first electrode 340' may be disposed between the seal member 380 and the overcoat 250 and a second electrode 350' may be disposed between the seal member 380 and the first electrode 340', where the piezoelectric layer 370 is disposed between the pair of electrodes 340' and 350'.

In exemplary embodiments, the thin film transistor array panel 100 may be positioned under the seal member 380 and may include a lower substrate 110 and a second protection layer 187 covering the lower substrate 110. Another protection layer or an insulating layer may be positioned between the second protection layer 187 and the lower substrate 110, however, such an additional layer is omitted in FIG. 19.

According to exemplary embodiments, the opposing display panel 200 may include a light blocking member 220 is positioned under an upper substrate 210 and an overcoat 250 covering the light blocking member 220. The piezoelectric sensor is positioned under the overcoat 250. That is, the first electrode 340' is positioned under the overcoat 250, the piezoelectric layer 370 is positioned under the first electrode 340', and the second electrode 350' is positioned under the piezoelectric layer 370. The piezoelectric layer 370 and the pair of electrodes 340' and 350' may be positioned to form a closed line based on the formation of the seal member 380.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensing display device, comprising:
    a thin film transistor array panel comprising a thin film transistor; and
    an opposing display panel facing the thin film transistor array panel, the opposing display panel comprising a first interlayer insulating layer, a piezoelectric sensor, and a capacitive sensor,
    wherein the capacitive sensor comprises:
        sensing wires;
        driving wires; and
        a bridge connecting the sensing wires together or the driving wires together via first contact holes formed through the first interlayer insulating layer,
    wherein:
        the piezoelectric sensor comprises first and second electrodes disposed on the first interlayer insulating layer, and a piezoelectric layer disposed between the first and second electrodes,
        the first interlayer insulating layer insulates the first and second electrodes from the sensing wires and the driving wires, and
        the bridge and the second electrode are formed of the same material and in the same layer.

2. The touch sensing display device of claim 1, wherein:
    the opposing display panel further comprises a spacer to maintain a gap between the thin film transistor array panel and the opposing display panel; and
    the second electrode is disposed between the spacer and the piezoelectric layer.

3. The touch sensing display device of claim 2, wherein:
    the opposing display panel further comprises a light blocking member, the light blocking member comprising an opening; and
    the driving wires, the sensing wires, the bridge, the first and second electrodes, and the piezoelectric layer overlap the light blocking member.

4. The touch sensing display device of claim 3, further comprising:
    an overcoat covering the light blocking member and disposed between the piezoelectric layer and the light blocking member; and
    a second interlayer insulating layer disposed between the first interlayer insulating layer and the piezoelectric layer,
    wherein the first interlayer insulating layer is disposed between the overcoat and the piezoelectric layer,
    wherein the driving wires and the sensing wires are disposed between the overcoat layer and the first interlayer insulating layer,
    wherein the piezoelectric layer and the first electrode are disposed between the first interlayer insulating layer and the second interlayer insulating layer, and
    wherein the second electrode and the bridge are disposed between the second interlayer insulating layer and the spacer.

5. The touch sensing display device of claim 4, wherein:
    the second electrode is electrically connected to the piezoelectric layer through a second contact hole extending through the second interlayer insulating layer, the second contact hole exposing a portion of the piezoelectric layer; and
    the bridge is electrically connected to the sensing wires or the driving wires through the first contact holes, the first contact holes extending through the second interlayer insulating layer and the first interlayer insulating layer to expose respective portions of the sensing wires or the driving wires.

6. The touch sensing display device of claim 5, wherein the first contact holes expose respective end portions of the sensing wires or the driving wires.

7. The touch sensing display device of claim 6, wherein:
the sensing wires or the driving wires are connected together through a longitudinal connection disposed on the bridge in a bridge connection region of the opposing display panel; and
the first electrode, the piezoelectric layer, and the second electrode are disposed outside the bridge connection region.

8. The touch sensing display device of claim 3, further comprising:
an overcoat covering the light blocking member and disposed between the piezoelectric layer and the light blocking member; and
a second interlayer insulating layer disposed between the first interlayer insulating layer and the piezoelectric layer,
wherein the first interlayer insulating layer is disposed between the overcoat and the piezoelectric layer,
wherein the driving wires and the sensing wires are disposed between the light blocking member and the overcoat,
wherein the piezoelectric layer and the first electrode are disposed between the first interlayer insulating layer and the second interlayer insulating layer, and
wherein the second electrode and the bridge are disposed between the second interlayer insulating layer and the spacer.

9. The touch sensing display device of claim 8, wherein:
the second electrode is electrically connected to the piezoelectric layer through a second contact hole extending through the second interlayer insulating layer, the second contact hole exposing a portion of the piezoelectric layer; and
the bridge is electrically connected to the sensing wires or the driving wires through the first contact holes, the first contact holes extending through the overcoat, the first interlayer insulating layer, and the second interlayer insulating layer, the first contact holes exposing respective portions of the sensing wires or the driving wires.

10. The touch sensing display device of claim 9, wherein the first contact holes expose respective end portions of the sensing wires or the driving wires.

11. The touch sensing display device of claim 10, wherein:
the sensing wires or the driving wires are connected together through a longitudinal connection disposed on the bridge in a bridge connection region of the opposing display panel; and
the first electrode, the piezoelectric layer, and the second electrode are disposed outside the bridge connection region.

12. The touch sensing display device of claim 1, further comprising:
a liquid crystal layer disposed between the thin film transistor array panel and the opposing display panel; and
a seal member sealing the liquid crystal layer between the thin film transistor array panel and the opposing display panel,
wherein the first and second electrodes are disposed on the seal member.

13. The touch sensing display device of claim 12, wherein the piezoelectric layer and the seal member at least partially surround a display area of the opposing display panel.

14. The touch sensing display device of claim 12, wherein:
the thin film transistor array panel further comprises:
a pixel electrode electrically connected to the thin film transistor; and
a common electrode disposed on the pixel electrode; and
the pixel electrode and the common electrode are configured to generate an electric field in the liquid crystal layer.

15. A method of manufacturing a touch sensing display device, the method comprising:
forming capacitive sensor wires on a substrate;
forming a first interlayer insulating layer on the capacitive sensor wires;
forming a first electrode of a piezoelectric sensor on the first interlayer insulating layer;
forming a piezoelectric layer on the first electrode;
forming a second interlayer insulating layer on the piezoelectric layer and the first electrode;
forming a first contact hole through the second interlayer insulating layer to expose a portion of the piezoelectric layer;
forming second contact holes through the second interlayer insulating layer and the first interlayer insulating layer to expose respective portions of some of the capacitive sensor wires; and
forming, in the same layer:
a second electrode of the piezoelectric sensor on the second interlayer insulating layer and the portion of the piezoelectric layer through the first contact hole; and
a bridge on the second interlayer insulating layer and the respective portions of the some of the capacitive sensor wires through the second contact holes.

16. The manufacturing method of claim 15, wherein:
forming the capacitive sensor wires comprises forming a longitudinal connection between at least some of the capacitive sensor wires in a bridge connection region;
the longitudinal connection and the bridge overlap one another; and
the first electrode, the piezoelectric layer, and the second electrode are formed outside the bridge connection region.

17. The manufacturing method of claim 15, further comprising:
forming a light blocking member on the substrate; and
forming an overcoat on the light blocking member,
wherein the capacitive sensor wires are formed on the light blocking member and the overcoat.

18. The manufacturing method of claim 15, further comprising:
forming a light blocking member on the substrate,
wherein the capacitive sensor wires are formed on the light blocking member.

19. The manufacturing method of claim 18, further comprising:
forming an overcoat covering the light blocking member and the capacitive sensor wires.

20. The manufacturing method of claim 19, wherein forming the second contact holes comprises:
patterning voids through the second interlayer insulating layer, the first interlayer insulating layer, and the overcoat to expose the respective portions of the some of the capacitive sensor wires.

* * * * *